(12) United States Patent
Lilje et al.

(10) Patent No.: US 9,430,499 B2
(45) Date of Patent: Aug. 30, 2016

(54) AUTOMATED FEATURE EXTRACTION FROM IMAGERY

(71) Applicant: Environmental Systems Research Institute (ESRI), Redlands, CA (US)

(72) Inventors: Anneliese Lilje, La Verne, CA (US); Jennifer Reiber Kyle, Sausalito, CA (US); Andrew Basile, Arrowbear Lake, CA (US)

(73) Assignee: ENVIRONMENTAL SYSTEMS RESEARCH INSTITUTE, INC., Redlands, CA (US)

( * ) Notice: Subject to any disclaimer, the term of this patent is extended or adjusted under 35 U.S.C. 154(b) by 0 days.

(21) Appl. No.: 14/624,883

(22) Filed: Feb. 18, 2015

(65) Prior Publication Data

US 2015/0234863 A1 Aug. 20, 2015

Related U.S. Application Data

(60) Provisional application No. 61/941,361, filed on Feb. 18, 2014.

(51) Int. Cl.
| | |
|---|---|
| G06K 9/00 | (2006.01) |
| G06F 17/30 | (2006.01) |
| G06T 7/00 | (2006.01) |
| G06T 7/40 | (2006.01) |

(52) U.S. Cl.
CPC ... *G06F 17/30259* (2013.01); *G06F 17/30241* (2013.01); *G06F 17/30244* (2013.01); *G06K 9/00637* (2013.01); *G06K 9/00651* (2013.01); *G06K 9/00657* (2013.01); *G06T 7/0081* (2013.01); *G06T 7/401* (2013.01); *G06F 2216/03* (2013.01); *G06T 2207/10032* (2013.01); *G06T 2207/20076* (2013.01); *G06T 2207/30184* (2013.01)

(58) Field of Classification Search
None
See application file for complete search history.

(56) References Cited

U.S. PATENT DOCUMENTS

| | | | |
|---|---|---|---|
| 2012/0075440 A1* | 3/2012 | Ahuja | G06T 7/0081 348/61 |
| 2015/0234863 A1* | 8/2015 | Lilje | G06F 17/30259 382/103 |

OTHER PUBLICATIONS

Assirati et al (NPL: "Satellite classification and segmentation using non additive entropy", pp. 3, 2013, doi:10.1088/1742-6596/490/1/012086).*

(Continued)

*Primary Examiner* — Bhavesh Mehta
*Assistant Examiner* — Oneal R Mistry
(74) *Attorney, Agent, or Firm* — Kilpatrick Townsend & Stockton LLP

(57) ABSTRACT

Embodiments of the invention are directed to a computer-implemented system and method of identifying human settlements in imagery comprising receiving an image, segmenting the image into a plurality of superpixels, analyzing statistical parameters of at least two or more of the plurality of superpixels, where the statistical parameters includes entropy data, and identifying groups of superpixels having at least a predetermined cluster density and a predetermined entropy. Some embodiments further include clipping the image to only include the identified groups of superpixels having the predetermined cluster density and entropy, analyzing statistical parameters of the clipped image, analyzing geometric factors of the clipped image, determining one or more settlements based on the statistical parameters and geometric factors of the superpixels, and identifying a shape and area of the one or more settlements based on the statistical parameters and geometric factors of the clipped image.

14 Claims, 16 Drawing Sheets

(56) References Cited

OTHER PUBLICATIONS

Barbieri et al (NPL: "An entropy-based approach to automatic image segmentation of satellite images", pp. 7, 2011, doi:10.1016/j.physa.2010.10.015).*

Tuzel et al (NPL: "Entropy Rate Superpixel Segmentation", Mitsubishi Electric Research Laboratories, Jun. 2011).*

Achanta R. et al. "SLIC Superpixels Compared to State-of-the-art Superpixel Methods", Journal of Latex Class Files, vol. 6, No. 1, Dec. 2011, 8 pages.

* cited by examiner

Non-Settlement Region
- Mean: 549
- Range: 1431
- Std Dev: 37.8
- Entropy: 7.18
- Median: 547
- Mode: 546
- Min: 419
- Max: 649

Settlement Region
- Mean: 444
- Range: 4556
- Std Dev: 67.5
- Entropy: 7.86
- Median: 454
- Mode: 450
- Min: 248
- Max: 590

Fence/Tree Region
- Mean: 375
- Range: 3484
- Std Dev: 59.0
- Entropy: 7.58
- Median: 379
- Mode: 416
- Min: 256
- Max: 520

*High level view of the ESEG algorithm*

*ESEG "connectivity enforcement" on superpixels*

*ESEG assignment of pixels to superpixels*

*ESEG (re)computing superpixel centers*

AUTOMATED FEATURE EXTRACTION FROM IMAGERY

CROSS-REFERENCES TO RELATED APPLICATIONS

The present application claims priority to U.S. Provisional Application No. 61/941,361, filed Feb. 18, 2014, which is incorporated herein by reference in its entirety for all purposes.

BACKGROUND

The present invention relates to efficiently extracting features from images, and in particular to automatically recognizing settlements in the underdeveloped world from satellite images.

Mapping human settlements and transportation networks in developing countries is critical to the successful planning and execution of global development and health programs. Detailed settlement maps support logistics and planning such as needed for the delivery of vaccines to rural areas and also create a foundation for development of more accurate population estimates critical to health programs.

Mapping human infrastructure in detail, including small settlements, compounds and local transportation networks using satellite imagery has been a labor intensive endeavor that requires highly skilled image analysts. Manual settlement extraction is also subject to certain analyst bias and therefore is not necessarily a repeatable process. Advancing the state of the science in automated techniques to capture the detailed features is the key to cost, time and workforce savings for governments of developing nations.

In image analysis, whether for satellite images or other images, there are many methods for feature identification. A first step in many methods is to break up the image into segments. Standard segmentation workflows may result in segments derived from rectangular grids, or superpixels. Superpixels are groupings of pixels that are similar insame spectral characteristics (color or shade), and/or being in proximity to each other. There are a number of algorithms for generating superpixels. The invention as described below in one embodiment adapts an existing algorithm, Simple Linear Iterative Clustering (SLIC), as described in "SLIC Superpixels Compared to State-of-the-art Superpixel Methods," by Radhakrishna Achanta, Appu Shaji, Kevin Smith, Aurelien Lucchi, Pascal Fua, and Sabine Süsstrunk, JOURNAL OF LATEX CLASS FILES, VOL. 6, NO. 1, DECEMBER 2011. SLIC uses k-means clustering, which basically clusters similar pixels or superpixels based on how close they are to each other.

SUMMARY

In one embodiment, the present invention improves the speed, efficiency and accuracy of feature extraction by using entropy to generate superpixels in an image. Entropy is related to the amount of variation between pixels in an area. Entropy can be used in addition to spectral matching or other statistics to generate superpixels. By generating and tagging superpixels defined using entropy, likely settlement areas are identified, eliminating the need to process other areas of the image, thus improving processing speed and reducing the amount of required memory.

The way entropy is used can depends on the resolution of an image and the scale at which extraction is performed. At a low image resolution, and large scale a settlement can have high entropy due the variation between buildings, fences and the ground and vegetation inbetween them. A forested, grassland or desert area, on the other hand, may be more consistent and thus would have low entropy. Thus, high entropy can be used to identify possible settlements. Once a settlement is identified, a higher resolution image examined at a small scale may have lower entropy for buildings and other man-made structures, and higher entropy for natural features, such as trees. The roof of a building would be a consistent shade or color, while a tree could have leafly and less-leafy areas, for example (in addition to generally have a round, rather than polygon, shape).

Embodiments of the present invention have been tested and shown to work on panchromatic (black & white/grayscale) images for settlements in undeveloped, semi-arid areas. The techniques of these embodiments can also be applied to color images as well as infrared images.

In one embodiment, once superpixels are identified using entropy, superpixels are clustered together using an ESeg method based loosely on SLIC. Instead of grouping superpixels based on distance, they are grouped based on a "best match" method, considering both spatial and spectral closeness.

In one embodiment, a four step process is used to identify settlements. (1) A Feature Localization step identifies clusters of high-entropy superpixels, which are likely to be settlements. Highly dispersed high-entropy superpixels and accompanying low-entropy superpixels are unlikely to be settlements. Compact clusters of high entropy superpixels with adjacent low energy superpixels are mode likely to be settlements. These latter cluster types are clipped from the image and separately examined. This significantly reduces the amount of the image that needs to be processed at a higher resolution. (2) A Feature Identification step confirms that the superpixel is indeed a settlement by using statistical parameters and geometric factors to identify man-made features in the superpixels (e.g., rectangular shapes for buildings and linear shapes for fences). (3) A Coarse Feature Description step is performed once a superpixel has been confirmed to be a settlement in step 2. Cluster and shape analysis are used to identify the settlement boundaries. Here again, entropy based cluster analysis is used, with low entropy indicating a single structure. (4) Fine Grained Feature Description is then performed to identify individual buildings, fences and other structures within the settlement.

DETAILED DESCRIPTION

Figure 1:
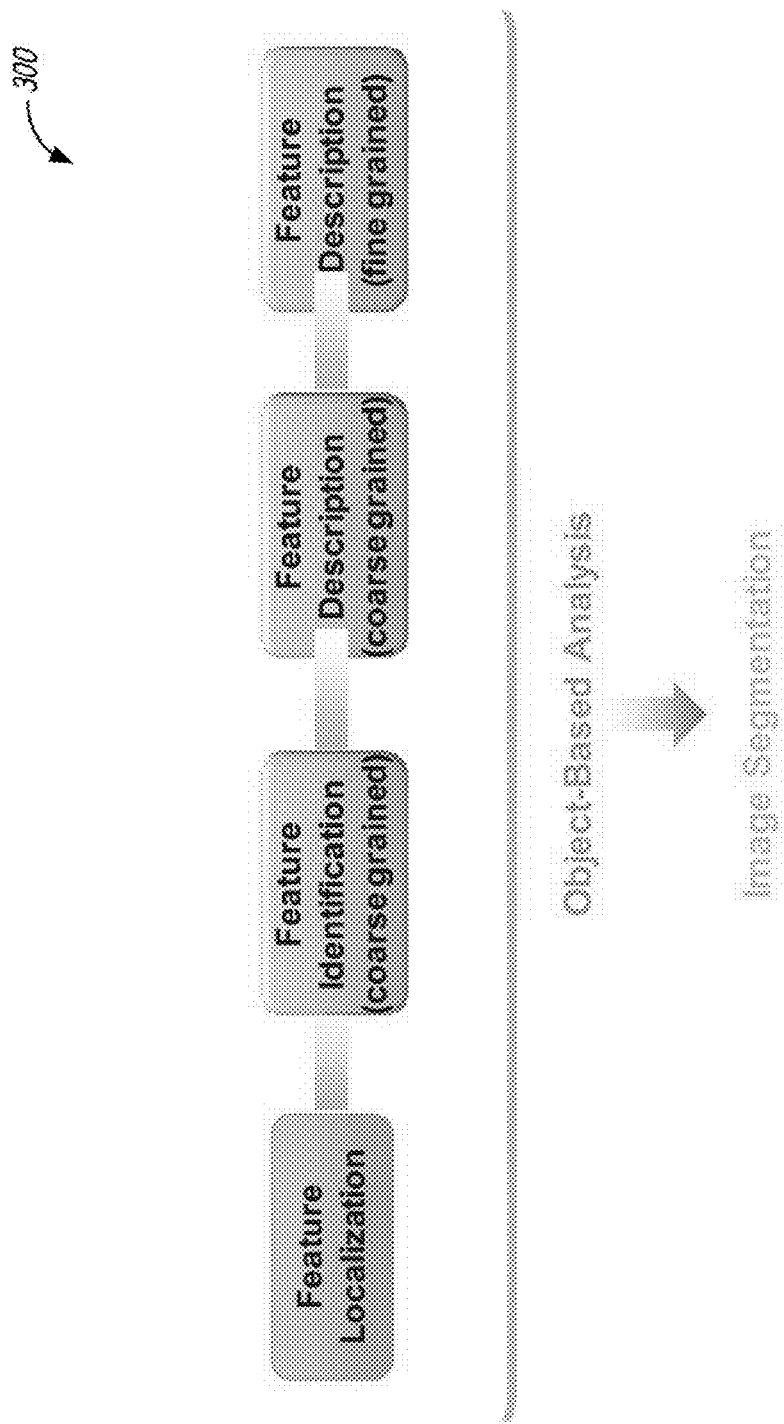
FIG. 1 shows a simplified diagram of the phases in the feature extraction process, according to certain embodiments of the invention.

Certain embodiments of the invention relate generally to feature identification and extraction from imagery.

Certain embodiments of the invention include a capability to create a settlement feature base map for satellite imagery through a highly-scalable, automated feature extraction process. Some novel features described herein include (1) Multi-phase feature extraction; (2) Leveraging Information Theory for image processing; (3) Object-based image analysis; and (4) a Cloud-based (Internet) feature extraction pipeline. These techniques, taken alone or in combination, allow for the automatic extraction and identification of e.g., settlements from aerial imagery. These applications can be expanded to include the automatic extraction of undeveloped world human infrastructure, and potentially other infrastructure around the world. These practices could then be leveraged to create infrastructure basemaps for developing nations.

Certain embodiments of the invention are guided by certain principal requirements that include: (1) Extracting human settlements from satellite imagery, (2) Extracting information for population estimation, and (3) using a cloud-based, scalable, automated feature extraction pipeline. A settlement can be defined as a significant grouping of compounds. Compounds in the developing world are typically created from local organic and non-organic materials and provide minimal shelter for its inhabitants. These compounds have a signature appearance that includes an approximately square fence line around the compound and round and/or rectangular huts inside the compound. For information extraction, the information required depends on a population estimation algorithm but can include the existence and location of a settlement, the area and shape of the settlement, or the configuration of buildings within compounds and the relationships between compounds within the settlement. A cloud-based feature extraction pipeline can enable feature extraction across a large region at a fraction of the time of manual feature extraction.

In some embodiments, tests were done on imagery from a panchromatic sensor was used having a 0.5 m ground sample distance, meaning each pixel records light from a patch on the ground approximately 0.5 m×0.5 m in size. However, the techniques of these embodiments can also be applied to color images as well as infrared or other images. In addition to landscape images, the embodiments could be applied to medical scans, security images and other images. For the use of entropy to distinguish features, those images having that have features of interest with high entropy could benefit from these processes.

Multi-Phase Feature Extraction

Automated extraction of relatively small features from high-resolution satellite imagery covering large regions can be complicated by the huge number of pixels that must be analyzed. This immense volume of pixels and scenes to search through does not make itself amenable to intense computation on each area of the scene. Therefore, a divide and conquer strategy is appropriate. In this example, to enable fast and accurate feature extraction across large regions of Nigeria, feature localization strategy was employed through a multi-phase feature extraction process.

FIG. 1 depicts a simplified diagram of the feature extraction process, according to certain embodiments of the invention. In the first phase, Feature Localization, the satellite imagery catalogue is analyzed to locate regions where the probability for settlements is highest. These images are examined at a low resolution, or with groups of pixels considered as one for examination. These areas are then "clipped" from the larger image for further processing at a higher resolution, where single pixels or smaller groups of pixels are examined. This can help focus the search for settlements and reduces the amount of data that must be processed in the following steps. Next, in the Feature Identification section, analysis on all of the possible settlement regions identified are performed to determine which regions actually represent settlements. In the Coarse-grained (low resolution) Feature Description section, information is extracted about the identified settlement that is useful for population estimation, such as the area and shape of the settlement. Finally, the settlement in the Fine-grained Feature Extraction phase is analyzed to identify and estimate the number of buildings and compounds within the settlement. This provides alternative data for population estimation algorithms.

Object-Based Image Analysis

The four feature extraction phases in FIG. 1 incorporate many different techniques, all of which are enabled by object-based analysis. Object-based analysis, as opposed to pixel-based analysis, uses groups of pixels, called "original objects," as the basis for analysis. Compared to pixel-based analysis, object-based analysis can offer higher feature detection accuracy, reduce processing time, and introduce the ability to employ a wide-array of vector-based geoprocessing tools that are already available.

Figure 2A:
FIGS. 2A-C illustrate image segmentation results using imagery, grid segmentation, and superpixel segmentation, according to certain embodiments of the invention.
Figure 2B:
Figure 2C:

To enable object-based analysis, images are segmented, and then spectral and entropy values for each segment is used as a means to separate original objects from background. The segmentation techniques used in this work are rectangular grid and superpixel segmentation. The results of these image segmentation techniques on an image of a settlement in Kano state of Nigeria are shown in FIGS. 2A-C (these images were obtained after going through the earlier phases to focus on a likely settlement). Grid segmentation is achieved by forming a grid of a desired size and grouping together pixels that fall in the same grid cell. While grid segmentation is quick and easy to employ, it only considers pixel position when forming the original objects. To form original objects that also reflect the image content, superpixel segmentation may be used.

According to certain embodiments of the invention, superpixel segmentation involves an iterative pixel clustering process followed by a cluster consolidation and analysis of resulting clusters to lower false positives. Initial clusters of pixels are seeded throughout the image at regular intervals corresponding with a grid. Seeding involves arbitrarily selecting a particular pixel or group of pixels as the clusters to start with, such as a cluster or group of pixels at the center of each square of a grid. Those clusters are iteratively refined such that pixels are grouped together by spatial and spectral similarities. However, the resulting clusters of pixels tend to be not be fully contiguous in a spatial sense. In the cluster consolidation process, each spatially distinct grouping of pixels within each cluster is treated as a separate cluster. The smallest clusters are consolidated with spatially adjacent clusters. The consolidation process considers spatial and spectral similarities when choosing pairs of adjacent clusters to join. The resulting, consolidated clusters are called superpixels. As can be seen in FIGS. 2A-C, the boundaries between superpixels nicely follow the outlines of the settlement. Therefore, superpixel segmentation shows great promise for identifying settlement boundaries.

In summary, according to certain embodiments, it is not the boundaries that are updated; rather, on each K-Means iteration, the members of each superpixel are updated pixel by pixel, with no regard for contiguity specifically. At times, while running the K-Means portion of the algorithm, the superpixels can be highly dis-contiguous. For visualization purposes, one can think of dipping a paintbrush in paint, then flinging it at a target on the wall. The paint may tend to mostly cover that target, but there will be non-contiguous spots of paint all around, still mostly centered around the target. At each K-Means iteration, target locations are refined and paint is re-flung more optimally (so to speak), but not necessarily with any contiguity. In one embodiment, a novel Enhanced Segmentation (ESEG) tool is using to cluster the superpixels, improving on the prior SLIC process reference in the background. ESEG is described below with respect to FIGS. 12-12E. It is ESEG's enhancements relative to SLIC that relate to, after completing all K-Means iterations, cleaning up those spots and produce nice, coherent clusters (e.g., superpixels).

Cloud-Based Feature Extraction Pipeline

Because the processing of imagery is intensive relative to standard vector-based GIS (Geographic Information System) processing, a scalable version of the automated feature extraction pipeline in the cloud has been developed. The advantage of this is its flexibility: as the processing needs throughout the pipeline change, the cloud seamlessly adapts with dynamic resource allotment. Additional computing instances can be replicated and increased on demand and, when they are not needed, shut down. This flexibility means that whether the processing is on the local, state, country or continent scale, the same setup can handle the task. In addition, completion timelines can be shortened simply by adding more cloud computing resources.

Feature Localization

Figure 5:
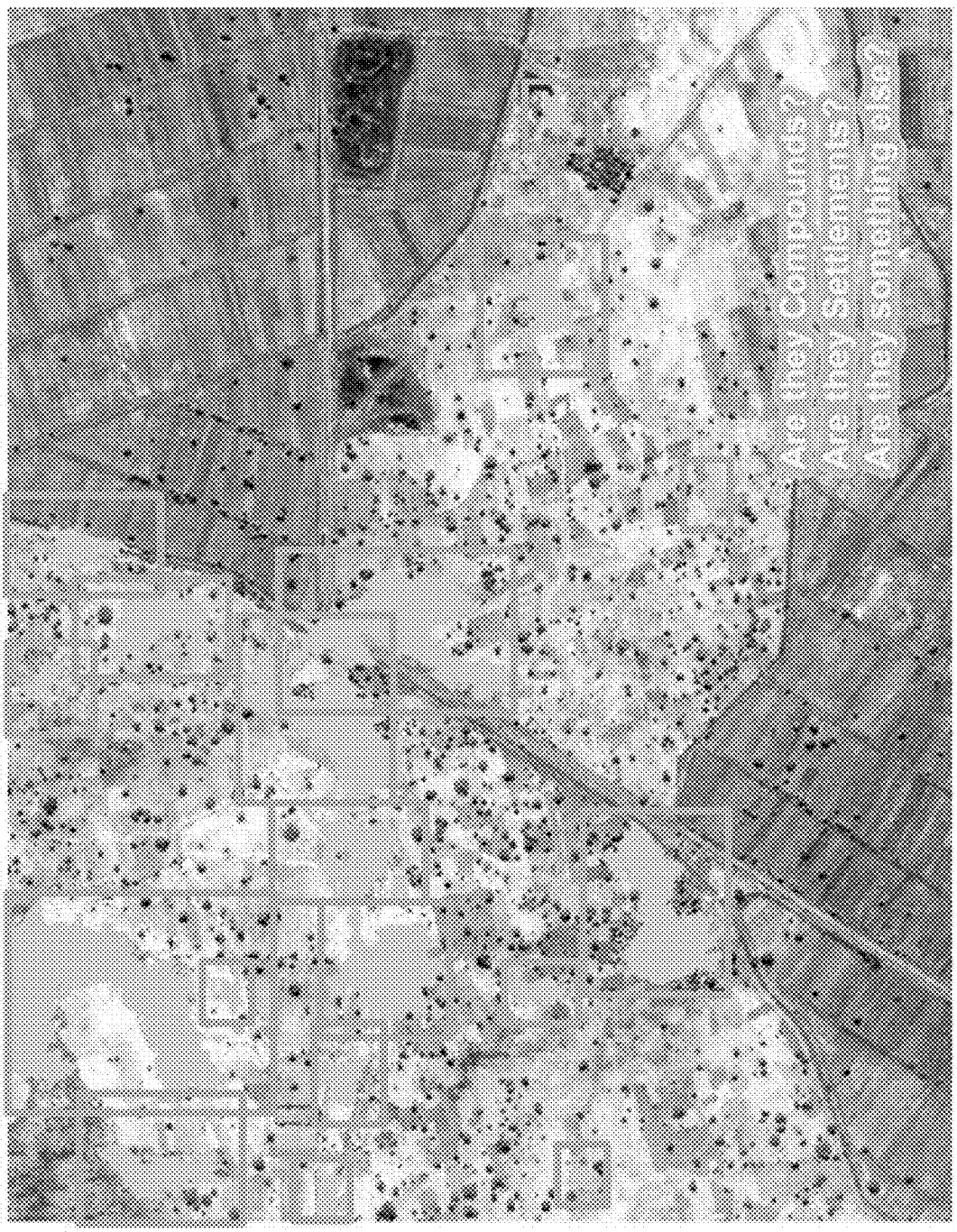
FIG. 5 depicts the location of possible settlements as polygons, which can be iteratively examined in each scene to evaluate more closely, according to certain embodiments of the invention.

In certain embodiments, Feature Localization is the first process in the feature extraction methodology. Localization means locating regions with a high likelihood of representing settlements. In this phase, polygons are drawn around those areas that are possible settlement locations (an example is shown in FIG. 5, discussed below). The imagery at these locations is then clipped for further processing in the Coarse-grained Feature Description phase. Although a coarse (low resolution) then fine (high resolution) process is described herein, multiple stages in between could alternately be used depending on the overall size of the area being examined.

Figure 3:
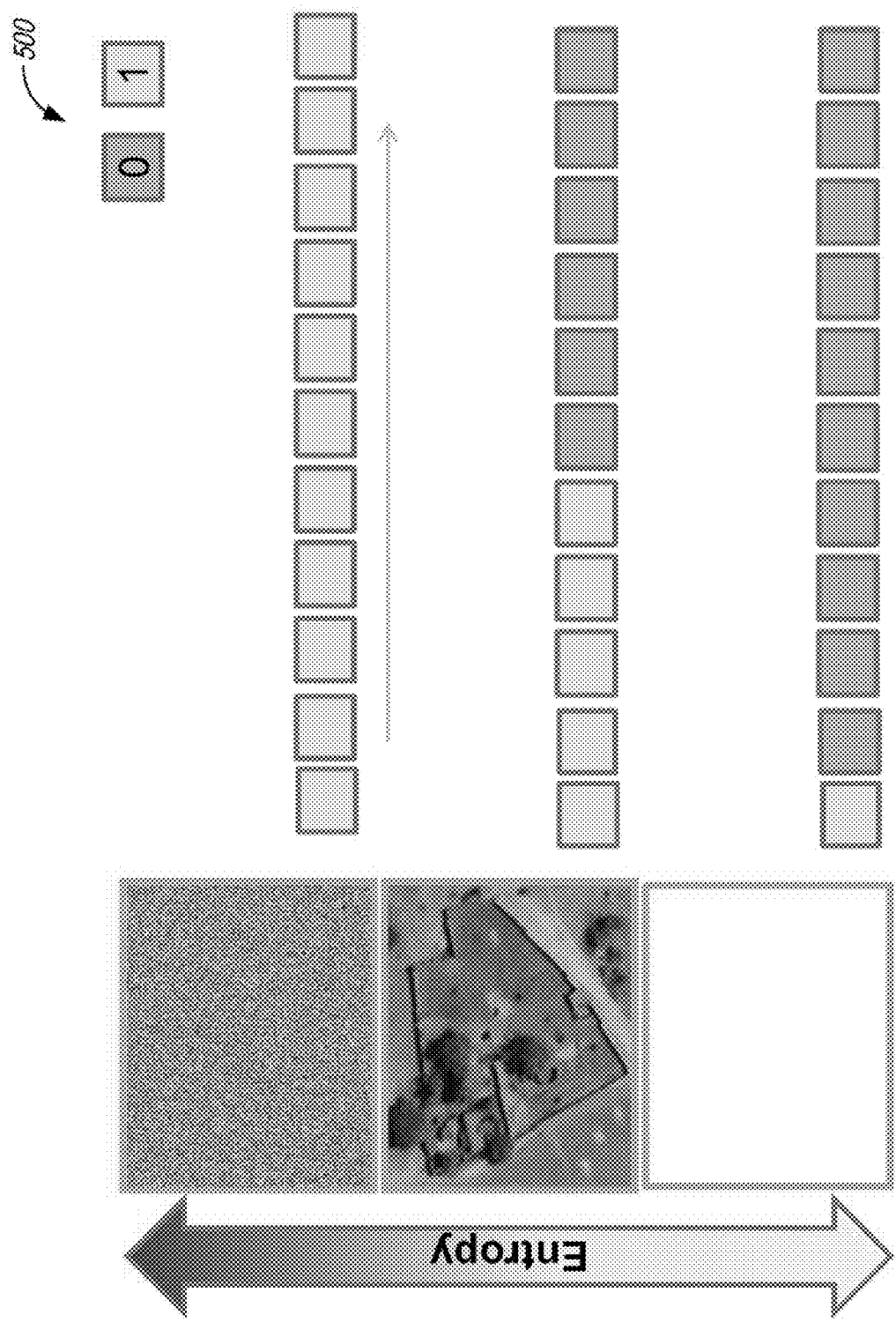
FIG. 3 illustrates the relationship between entropy and image content, according to certain embodiments of the invention.

An embodiment was tested on satellite images of Nigeria. In this example (Nigeria), settlement regions are typically marked by a dense arrangement of features, such as buildings and fences, against a relatively uniform background. Therefore, there is a greater variation in the intensity values of pixels in a settlement region than in non-settlement regions. This increase in variability, and associated unpredictability, called entropy, is a valuable parameter for localizing settlements. The relationship between entropy and image content is illustrated in FIG. 3. Entropy increases as the image content changes from a single intensity value to random static. While compounds contain regions of small intensity variations, such as grass fields, they also contain regions of large intensity variations, such as buildings and their associated shadows. The entropy of these compound regions is high.

In this particular non-limiting embodiment, each of the images over the Kano state of Nigeria were segmented using a 20 m×20 m grid. When the entropy of the grid cells is visualized over a scene, settlements of all sizes can be visualized quite easily by the clusters of bright red pixels. Red pixels (or any suitable assignable color) are used to indicate the highest entropy areas in the scene. The test was able to discern between settlements, which had bright clusters of high value entropy. Clusters without these same high entropy values were confirmed by human observation to not be settlements in the test, and were natural features, such as a raised area of rock. This localization method is sensitive enough to able to correctly discern these types of differences.

Figure 4:
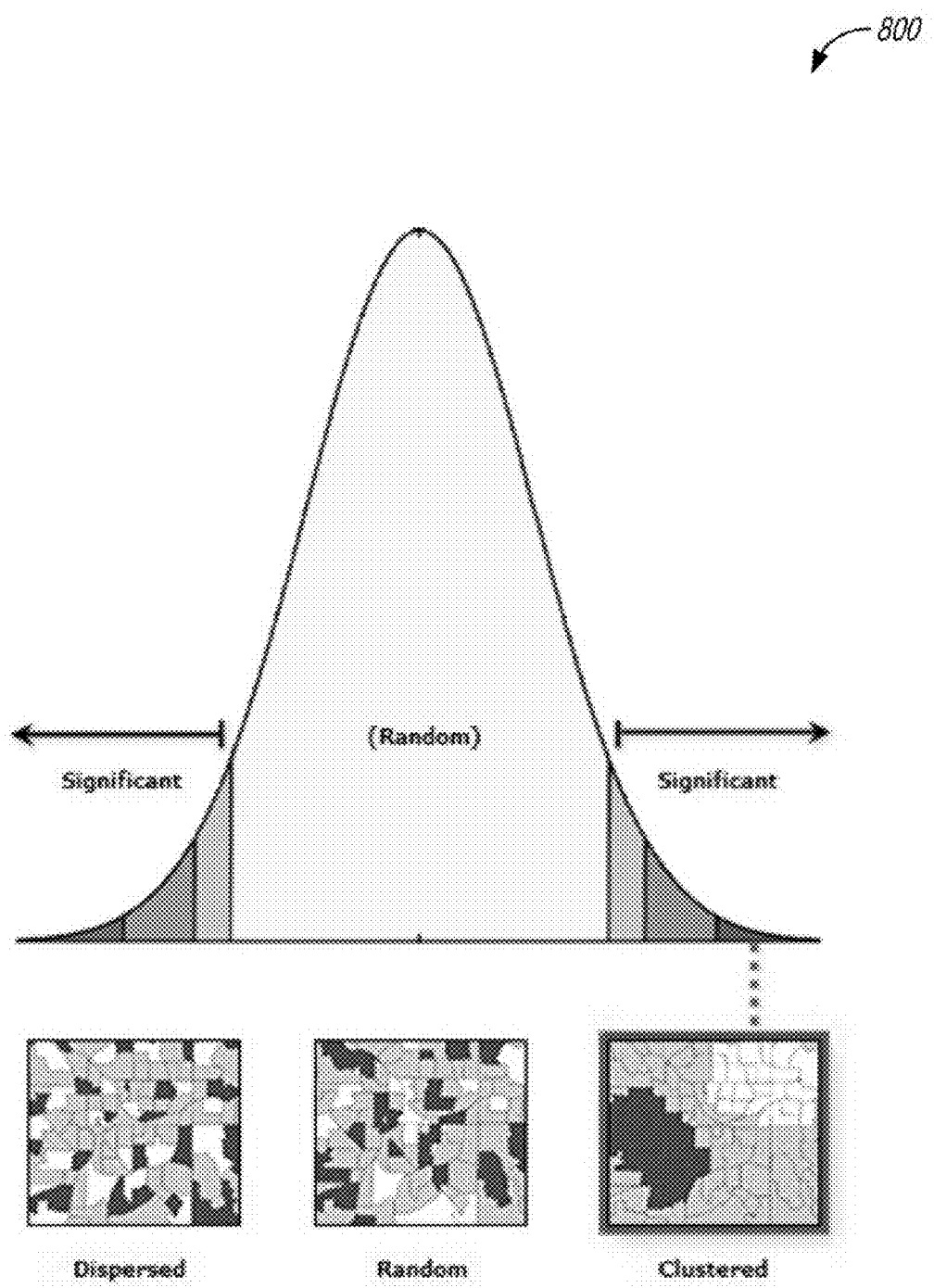
FIG. 4 depicts the relationship between values of the Local Moran's I Spatial Autocorrelation process and clustering.

To localize settlements using the entropy map, cluster analysis can be used to identify significant clusters of high-entropy cells. One tool that can be used for the cluster analysis is Moran's I, a Spatial Autocorrelation tool that is part of Esri's ArcGIS Spatial Statistics toolbox available at esri.com. Moran's I can provide a way to determine if high-entropy objects in a scene are clustered in large clusters, randomly placed, or highly dispersed, as depicted in FIG. 4.

In a test of one embodiment, regions likely to be settlements, identified as highly clustered, high-entropy objects, were indicated by pink polygons. To examine the correlation between the possible settlement locations and actual locations hand digitized from the same image, the actual hand digitized interpretation of settlement locations was overlaid on the automated selection of the possible locations. There was a high correlation between the automatically mapped possible settlements and manually-extracted settlements, demonstrating the efficacy and accuracy of the automatic settlement localization process. This settlement localization process also identified some possible regions that were not present in the manually extracted dataset. These false positives are filtered out in a Feature Identification phase. The final step in this phase is clipping the image using each of the possible settlement polygons, as shown in FIG. 5. Each of these clipped images will be examined further in the Feature Identification phase.

Feature Identification

Figure 6A:
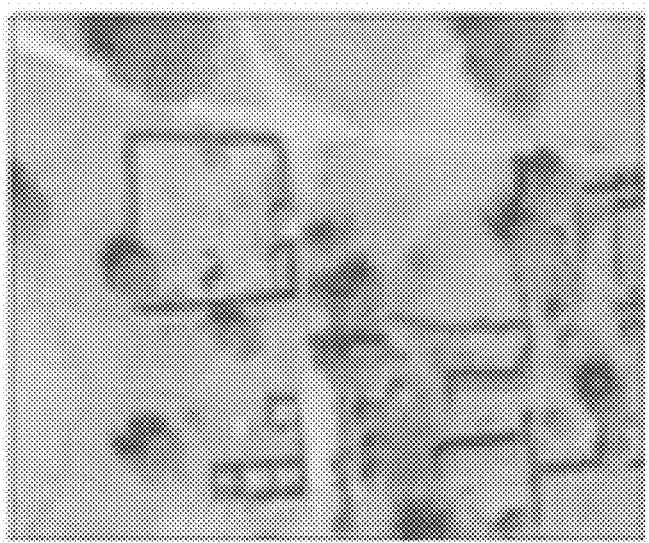
FIGS. 6A-C depicts a non-settlement, settlement, and compound fence regions and their associated statistics, according to certain embodiments of the invention.
Figure 6B:
Figure 6C:

In the Feature Identification phase, the possible settlement region is analyzed in detail to determine the existence of a settlement within the region. This is achieved by analyzing each image clip (or some subset thereof) created in the Feature Localization phase. To make a determination as to the existence of a settlement, a combination of statistical parameters (e.g., contrast, mean, mode, median, standard deviation, and entropy) and geometric factors (e.g., edge detection) can be used. In addition, man-made features tend to cause greater contrast variations and exhibit greater standard deviations than natural features. FIGS. 6A-C show images highlighting a non-settlement region (FIG. 6A), a settlement region (FIG. 6B), and a compound and fence/tree region (FIG. 6C), along with the statistics calculated from each region. Maximum and minimum values are indicated. These statistical parameters can be used as part of the evidence to determine the existence of a settlement.

Feature Description (Coarse Grained)

Figure 7:
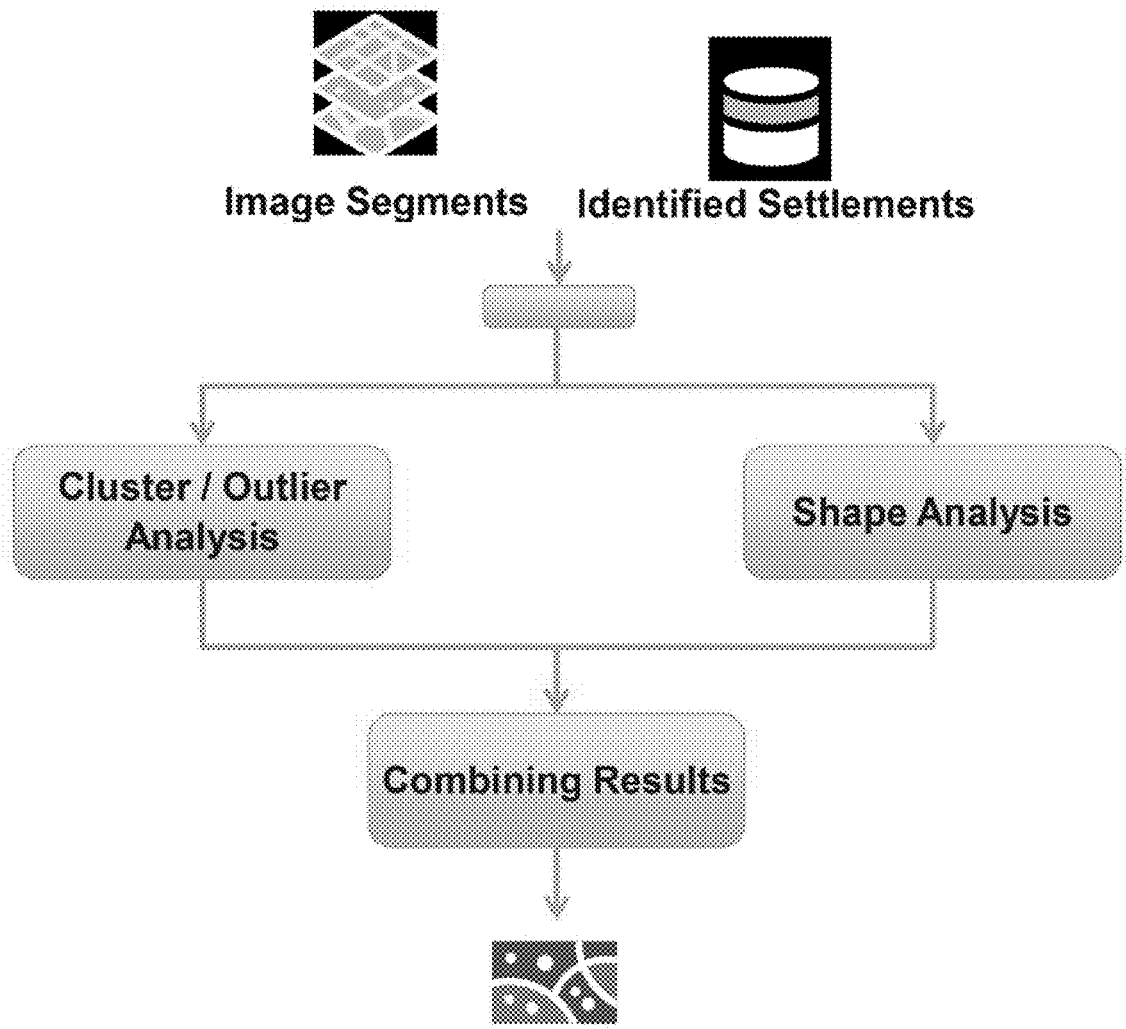
FIG. 7 depicts a simplified flow diagram showing a coarse-grained feature description process, according to certain embodiments of the invention.

In the Coarse-grained Feature Description step, the shape and area of each settlement (or some subset thereof) is identified. Both of these descriptors can be determined from the settlement boundary. The input to the Coarse-grained Feature Description process, as shown in FIG. 7, is a dataset of the settlements identified in the Feature Identification step and the image segments around these settlements. Cluster analysis and shape analysis is performed on the image segments and the results are combined to identify the settlement boundaries.

To extract the initial settlement boundaries, we perform entropy-based cluster analysis using the same technique as in Feature Identification to identify the settlement regions. The settlement boundary extraction results using grid segments and superpixel segments were compared in a test to manual extraction. The images showed that the grid-based and superpixel-based approaches both roughly estimate the settlement area. Superpixels, however, provide superior settlement boundary detection.

Feature Description (Fine Grained)

The area calculated by the Coarse-Grained Feature Description phase is used as the beginning point of the Fine-Grained Feature Description phase. A purpose of this phase is to identify individual buildings and other objects in a scene. As shown in FIGS. 2A-C, referenced above, examples of features in the image include buildings, fences and trees. At this level, the entropy of pixels showing the roof of an individual building will be less than the entropy of pixels for a tree (note that large trees can have the same scale as a house). The building roof may be flat with a consistent shade of gray or color, or it could be a peaked roof where, depending on the sun, the two sides may be different (e.g., one side in the sun and the other in the shade). In combination with using entropy, shape matching can be used. A round shape typically corresponds to a tree (but could be a water tower or other man-made structure if there is low entropy). Rectangular shapes may be buildings, while long, narrow rectangular shapes can be fences.

Cascade Segmentation

To delineate individual buildings, a segmentation technique should be sensitive to the scale and boundaries that differentiate these buildings from other objects within the settlements. While single-scale superpixel segmentation alone can achieve this if the exact value of the building is used as the optimal superpixel size, this approach is guesswork and does not always work. As the size of the average superpixel decreases, the delineation of intensity differences into segments that outline the smaller characteristics of the houses becomes more evident. This is reasonable as details on the houses are scale-dependent.

GIS can provide a foundation on which polygons from one layer can be integrated intelligently in others. The result is a segmentation process called "Cascade Segmentation" that allows the better delineation of the smaller objects in the scene. In cascade segmentation, the segmentation of the scene could be directed in a way to delineate individual compounds within the larger settlement. This would provide an integration of objects from several scale levels to create more detailed objects in scenes.

Applications and Opportunities

The methods described herein can be applied to large areas of the world and for many other landscape features in addition to settlements. These methods and technologies can be used to greatly improve the cost profile for mapping, for example, cultural features and vegetation features of the world. These methods, procedures, and techniques directly support population modeling and can be further expanded to support land use and land cover mapping. Efficient feature extraction can be accomplished with robust cloud processing to quickly adjust for the variations (extraction parameters) in landscape and available imagery. The below 4 steps illustrate a generalization of the workflow for production style settlement extraction, according to certain embodiments of the invention. This workflow is also applicable to other automated extraction problems.

Step 1: Define Area Of Interest (AOI) and initial assessment.

Step 2: Obtain extraction parameters for a parameter file.

Step 3: Validate extraction and feedback adjustments to step 2.

Step 4: Process in the cloud and prepare for delivery.

Approach to Environmental Variability

New landscapes and new sensor types will be encountered around the. In order to perform automated feature extraction throughout the world, a production module to obtain settlement extraction parameters for unique AOIs can be used. This "parameter generator" can utilize a catalogue of ESRI ArcGIS layers derived from high resolution maps. The maps will provide the authoritative data determined to be useful for creating the parameters for the extraction system. These layers can include biomes, geology, and soils, among others. Each class in a layer can lead to certain parameters for the feature extraction process. For each unique layer combination, a parameter configuration can be built by combining the parameter values determined for individual layer classes.

A parameter generator system can perform settlement extraction cost-effectively on a per-order basis. When a customer places an order, a shape file of the AOI can be requested or created from their description and put in the parameter generator system. The system then calculates parameters for the AOI of interest. The resulting parameter configuration file can then be used in the feature extraction system to perform a run on some very small sample areas in the AOI. The results of the extraction process would then be visually inspected to see if the extractions that result would meet customer requirements. If the sample results meet requirements, the AOI can move to processing. The parameter can be stored for future reference. However, if the results of the sample run do not meet the requirements of the customer, the map inputs can be adjusted and the samples re-evaluated. This is somewhat synonymous with calibrating a camera. One difficult scenario would be a new area or one where the data in the input layers were grossly inaccurate. In this this instance, the configuration process and samples can update the "authoritative" layers that we previously believed to be "correct."

An illustration of how this new technology can change world mapping, Table 1 illustrates the physical provinces or landscapes of Ethiopia that can be determined using the embodiments described herein.

TABLE 1

Description and Area of Ethiopian Provinces

| Province/Region | Area in sq. km. | Description |
| --- | --- | --- |
| Northern Highlands | 390363 | montane forest elevations up to 4200 mAMSL |
| Ogaden | 86277 | dry flat arid featureless plain; little to no vegetation |
| Eastern Plateau | 114266 | dry hilly arid; light vegetation |
| Southern Piedmont | 39299 | hilly dessicated land |
| Genale Dawa | 47532 | sparsely inhabited rocky outcrops; low vegetation |
| Rift Valley | 61239 | trench with vegetation and good drainage |
| Borema | 12803 | mesa like plateaus; barren lowlands |
| East Sudanian savanna | 52461 | hot dry tropical savanna |
| Denakil | 115542 | desert volcanic rocks; inhospitable terrain |
| Central Highlands east | 103391 | rugged volcanic dessicated lands; vegetation at higher elevs |
| Sahelian Acacia savanna | 34036 | hot dry with seasonal rainfall; grasses and shrubs |
| Eastern Tablelands | 71150 | subequatorial climate; scrub and low vegetation |
| total | 1128359 | |

Shape Descriptors for Settlement Detection

Figures 8, 9:
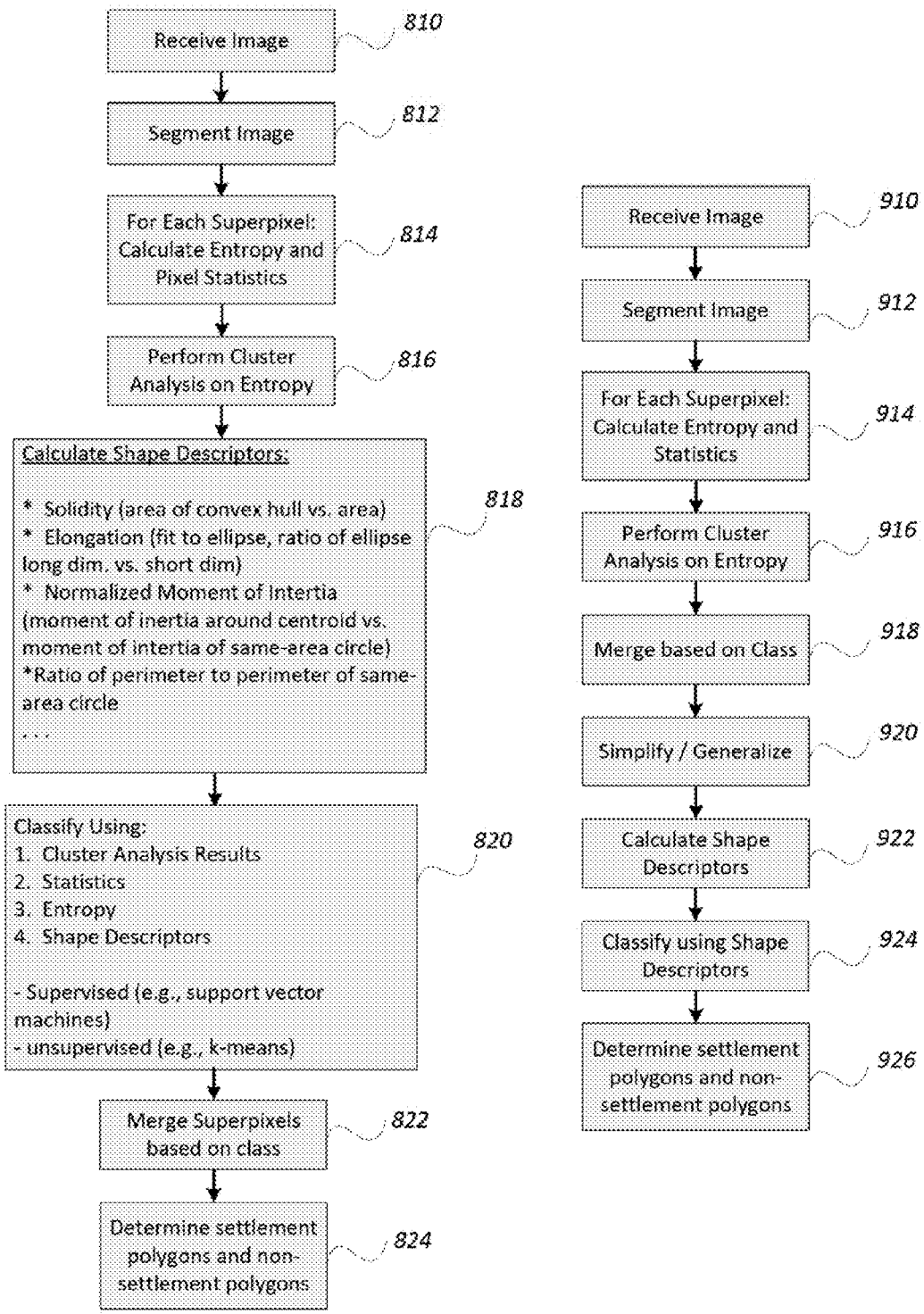
FIG. 8 depicts a simplified flow diagram illustrating aspects of using shape descriptors in a settlement detection process, according to certain embodiments of the invention.
FIG. 9 depicts another simplified flow diagram illustrating aspects of using shape descriptors in a settlement detection process, according to certain embodiments of the invention.

FIGS. 8 and 9 depict simplified flow diagrams illustrating aspects of using shape descriptors in a settlement detection process, according to certain embodiments of the invention. In FIG. 8, an image is received (step 810) and segmented (812) into superpixels. For each superpixel, the entropy and pixel statistics are calculated (814).

In step 818, shape descriptors are calculated. One descriptor is solidity (area of convex hull vs. area). Another is elongation (fit to ellipse, ration of ellipse long dimension vs. short dimension). Another is the normalized moment of inertia (moment of inertia around centroid vs. moment of inertia of same-area circle). Another descriptor is the ratio of the perimeter of the superpixel to the perimeter of a same-area circle. Additional descriptors can also be calculated.

In step 820, the superpixels are classified using (1) cluster analysis results, (2) statistics, (3) entropy and (4) shape descriptors. The classification can either be supervised (e.g., using support vector machines) or unsupervised (e.g., K-means). The classified superpixels are then merged based on classification (822). The superpixels are examined based on shape to determine polygons that correspond to settlements, and ones that do not (824).

Figure 10:
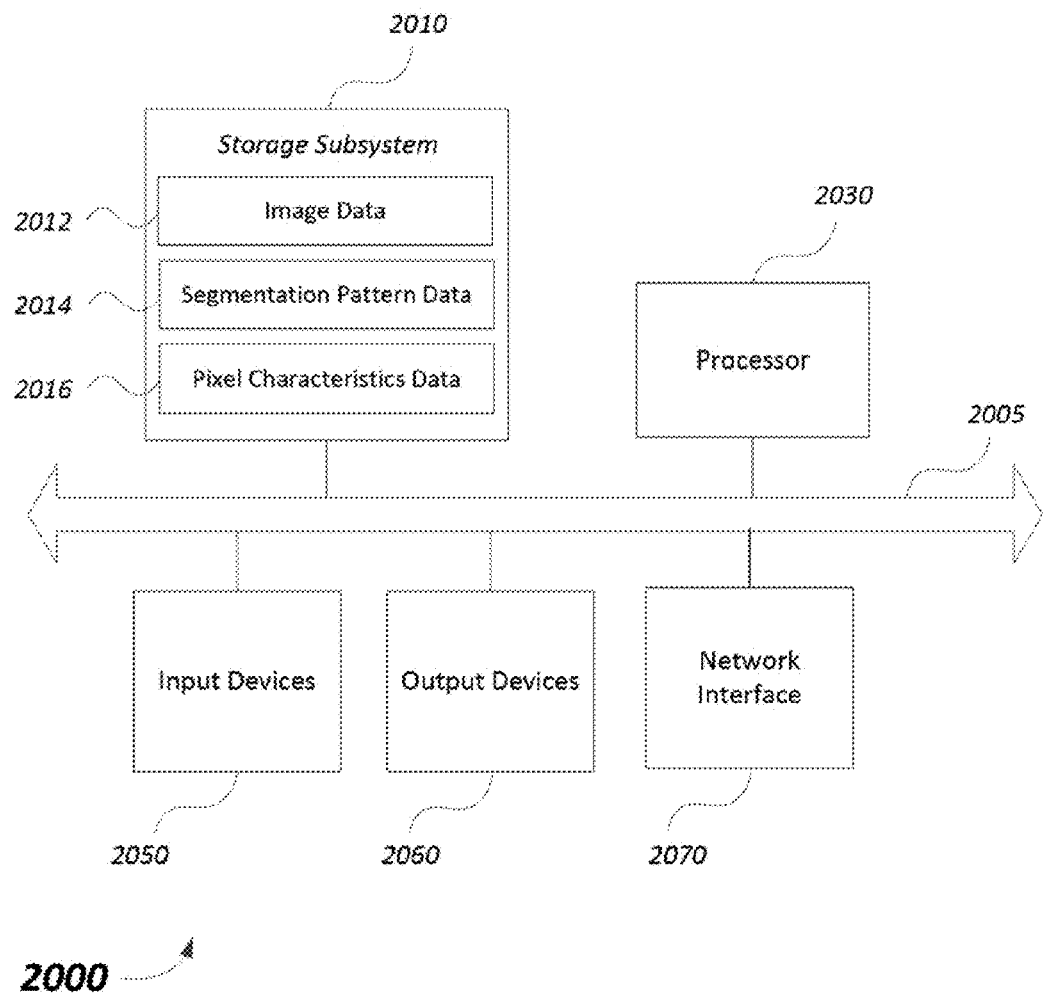
FIG. 10 illustrates a computer system for performing aspects of automated feature extraction from imagery, according to certain embodiments of the invention.

FIG. 9 illustrates an alternate process flow, with the shape descriptors calculation coming later in the process. An image is received (910) and segmented into superpixels (912), and for each superpixel, the entropy and statistics are calculated (914), and cluster analysis based on entropy is done (916), as in FIG. 8. Next, however, the superpixels are merged based on classification (918). A simplification and generalization step based on the shape analysis of the adjacent low entropy superpixel are considered to be settlements or compounds. Next, shape descriptors are calculated (922) and the superpixels are classified using the calculated shape descriptors (924). Finally, the superpixels are examined based on shape to determine polygons that correspond to settlements, and ones that do not Sample Embodiments of System Architectures FIG. 10 illustrates a computer system 2000 for performing automated feature (e.g., settlement) extraction from imagery, according to certain embodiments of the invention. The image processing, algorithms, and methods described herein can be implemented within a computer system such as computer system 2000 shown here. Computer system 2000 can be implemented as any of various computing devices, including, e.g., server(s), a desktop or laptop computer, tablet computer, smart phone, personal digital assistant (PDA), or any other type of computing device, not limited to any particular form factor. Computer system 2000 can include processing unit(s) 2030, storage subsystem 2010, input devices 2050 (e.g., keyboards, mice, touchscreens, etc.), output devices 2060 (e.g., displays, speakers, tactile output devices, etc.), network interface 2070 (e.g., RF, 4G, EDGE, WiFi, GPS, Ethernet, etc.), and bus 2005 to communicatively couple the various elements of system 2000 to one another.

Processing unit(s) 2030 can include a single processor, multi-core processor, or multiple processors and may execute instructions in hardware, firmware, or software, such as instructions stored in storage subsystem 2010. The storage subsystem 2010 can include various memory units such as a system memory, a read only memory (ROM), and permanent storage device(s) (e.g., magnetic, solid state, or optical media, flash memory, etc.). The ROM can store static data and instructions required by processing unit(s) 2030 and other modules of the system 2000. The system memory can store some or all of the instructions and data that the processor needs at runtime.

In some embodiments, storage subsystem 2010 can store one or more of data or software programs to be executed or controlled by processing unit(s) 2030, such as image data 2012, segmentation pattern data 2014, or pixel characteristic data 2016, as further described above with respect to FIGS. 1-4. As mentioned, "software" can refer to sequences of instructions that, when executed by processing unit(s) 2030, cause computer system 2000 to perform certain operations of the software programs. The instructions can be stored as firmware residing in read only memory and/or applications stored in media storage that can be read into memory for processing by processing unit(s) 2030. Software can be implemented as a single program or a collection of separate programs and can be stored in non-volatile storage and copied in whole or in part to volatile working memory during program execution. From storage subsystem 2010, processing unit(s) 2030 can retrieve program instructions to execute in order to execute various operations (e.g., interpolations) described herein.

It will be appreciated that computer system 2000 is illustrative and that variations and modifications are possible. Computer system 2000 can have other capabilities not specifically described here in detail (e.g., GIS technologies). Further, while computer system 2000 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Aspects of system 2000 may be implemented in many different configurations. In some embodiments, system 2000 may be configured as a distributed system where one or more components of system 2000 are distributed over one or more networks in the cloud (remote Internet servers). FIG. 21 depicts a simplified diagram of a distributed system 2100 for providing a system and method for performing automated feature (e.g., settlement) extraction from imagery, according to an embodiment of the invention. In the embodiment depicted in FIG. 21, system 2100 is provided on a server 2102 that is communicatively coupled with one or more remote client devices 2110, 2120, 2130 via network 2106 (e.g, a cloud pipeline).

Network 2106 may include one or more communication networks, which could be the Internet (cloud), a local area network (LAN), a wide area network (WAN), a wireless or wired network, an Intranet, a private network, a public network, a switched network, or any other suitable communication network or combination thereof. Network 2106 may include many interconnected systems and communication links including but not restricted to hardwire links, optical links, satellite or other wireless communications links, wave propagation links, or any communication protocol. Various communication protocols may be used to facilitate communication of information via network 2106, including but not restricted to TCP/IP, HTTP protocols, extensible markup language (XML), wireless application protocol (WAP), protocols under development by industry standard organizations, vendor-specific protocols, customized protocols, and others as would be appreciated by one of ordinary skill in the art. In the configuration depicted in FIG. 11, aspects of system 800 may be displayed on any of client devices 2110, 2120, 2130.

Figure 11:
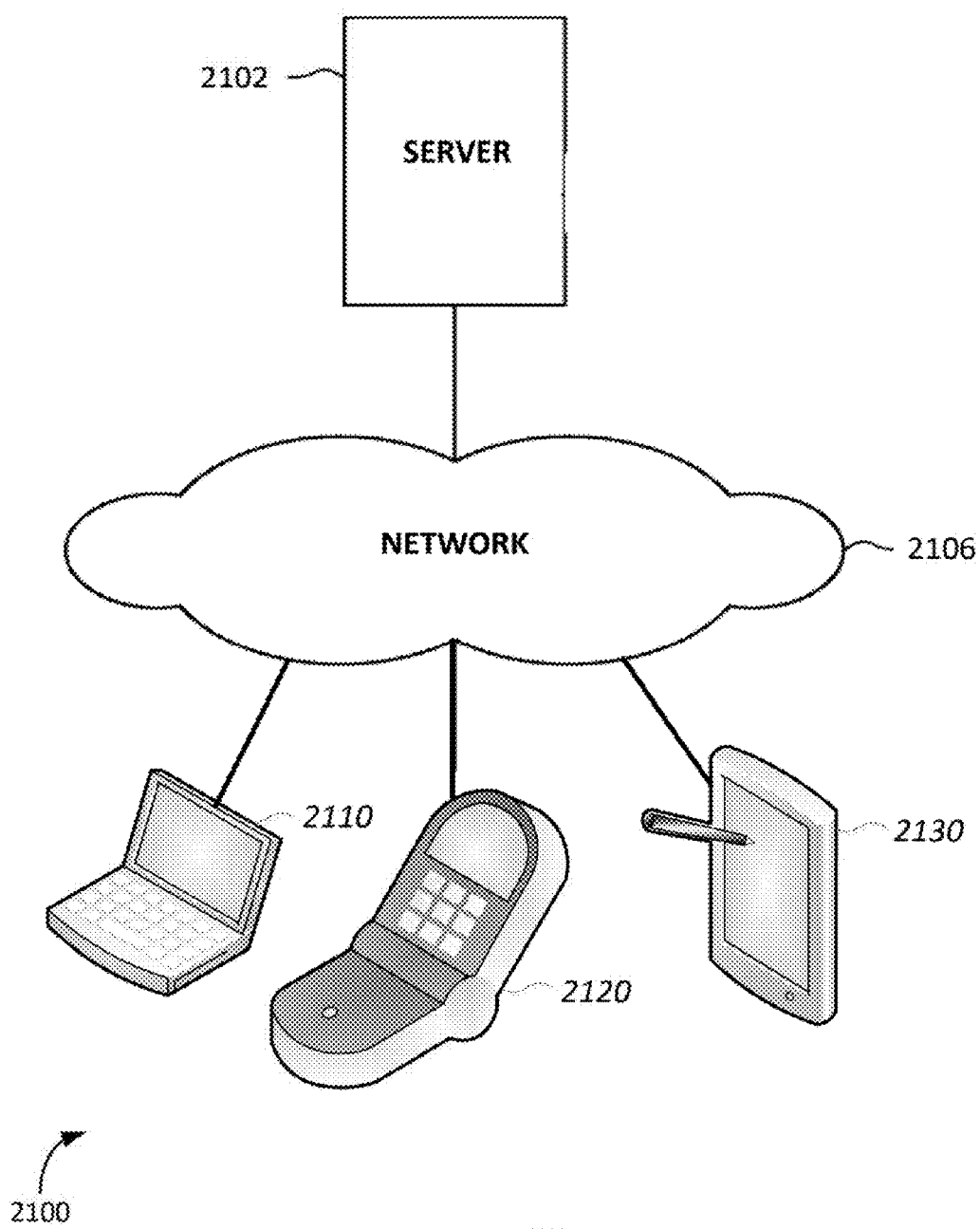
FIG. 11 depicts a simplified diagram of a distributed system for providing a system and method for performing aspects of automated feature extraction from imagery, according to certain embodiments of the invention.

In the configuration depicted in FIG. 11, system 900 is remotely located from client devices 2110, 2120, 2130. In some embodiments, server 2102 may perform the methods of determining (or interpolating) a population over a geographic area described herein. In some embodiments, the services provided by server 2102 may be offered as web-based or cloud services or under a Software as a Service (SaaS) model, as would be appreciated by one of ordinary skill in the art.

The cloud servers in one embodiment provide multiple instantiations of the processing program, or elements of the processing program, on one or more servers. This allows the parallel processing of different image segments to speed the processing of a target geographic area. Superpixels along a segment border can be referred to another instantiation, or combined with a current instantiation, for processing. Instantiations that complete their processing can be closed down. Instantiations for segments with few settlements will complete their processing earlier. This provides an efficient use of computer resources, in addition to increasing the speed of the overall processing. The resulting process images can be stitched together for a complete processed image. The clipped images can be mapped to an overall, low resolution, image of the entire target geographic area.

Enhanced Segmentation

Automatically detecting objects, or features, in imagery is important in a wide array of applications. However, analysis conducted in a pixel by pixel manner can be complicated and difficult to generalize. Analyzing imagery at a higher level, by examining groups of pixels rather than individual pixels, improves the ease of performing feature detection.

In image segmentation, an image is divided into discrete areas that are self-similar by some measure. Each of those areas of similarity can be referred to as a "superpixel", a grouping of pixels.

ESEG (Enhanced Segmentation) according to an embodiment of the present invention is an image segmentation algorithm. A 'Segment Raster' geoprocessing tool implements the ESEG algorithm, produces statistics for each grouping of pixels, and offers an option to divide the input image using a simple grid as an alternative to segmentation.

Figure 12:
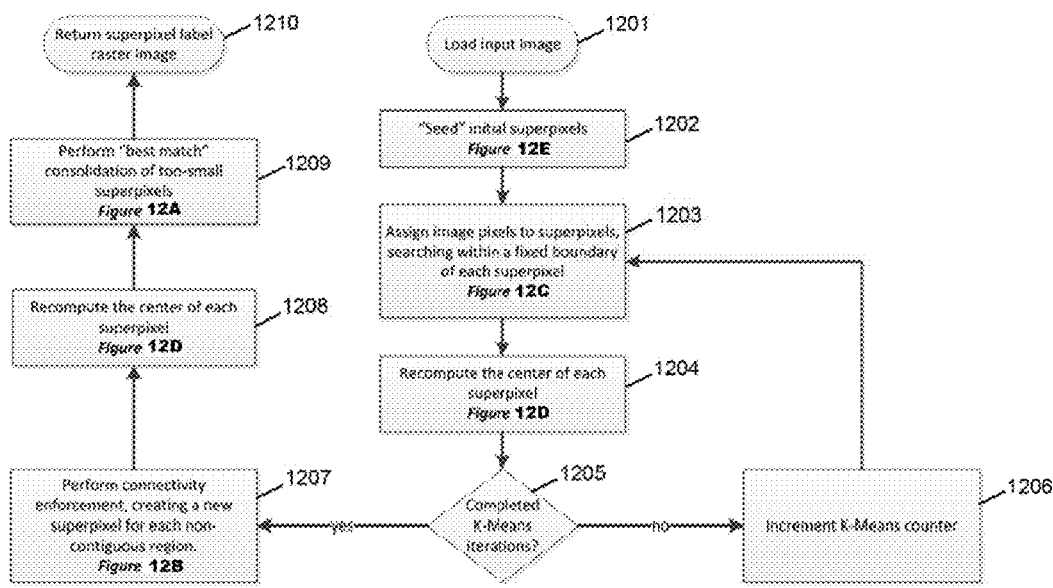
FIG. 12 is a flowchart of the ESEG method which improves on the SLIC method of clustering superpixels.
Figure 12A:
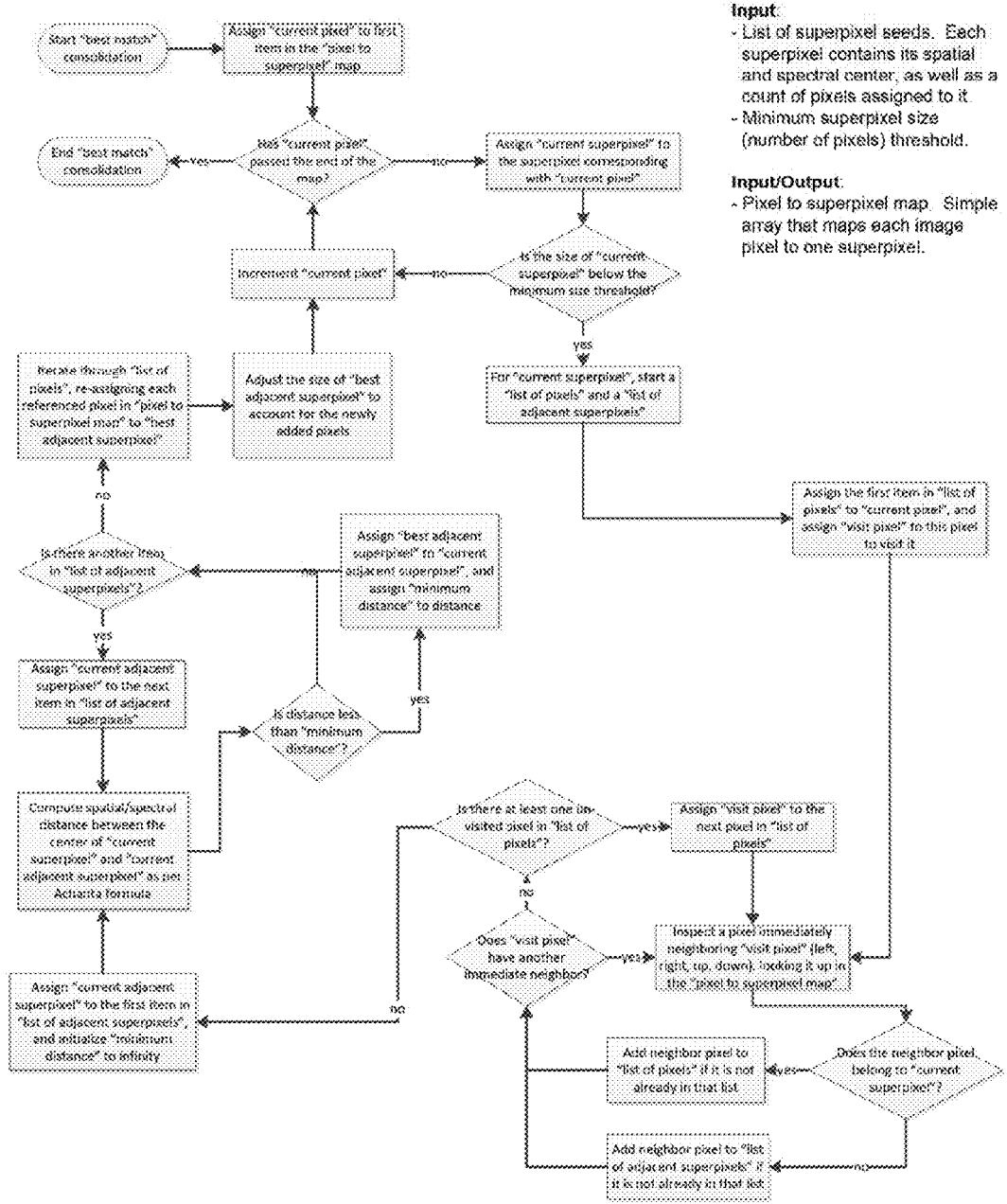
FIGS. 12A-E are expanded flowcharts of the elements of the flowchart of FIG. 12.
Figure 12B:
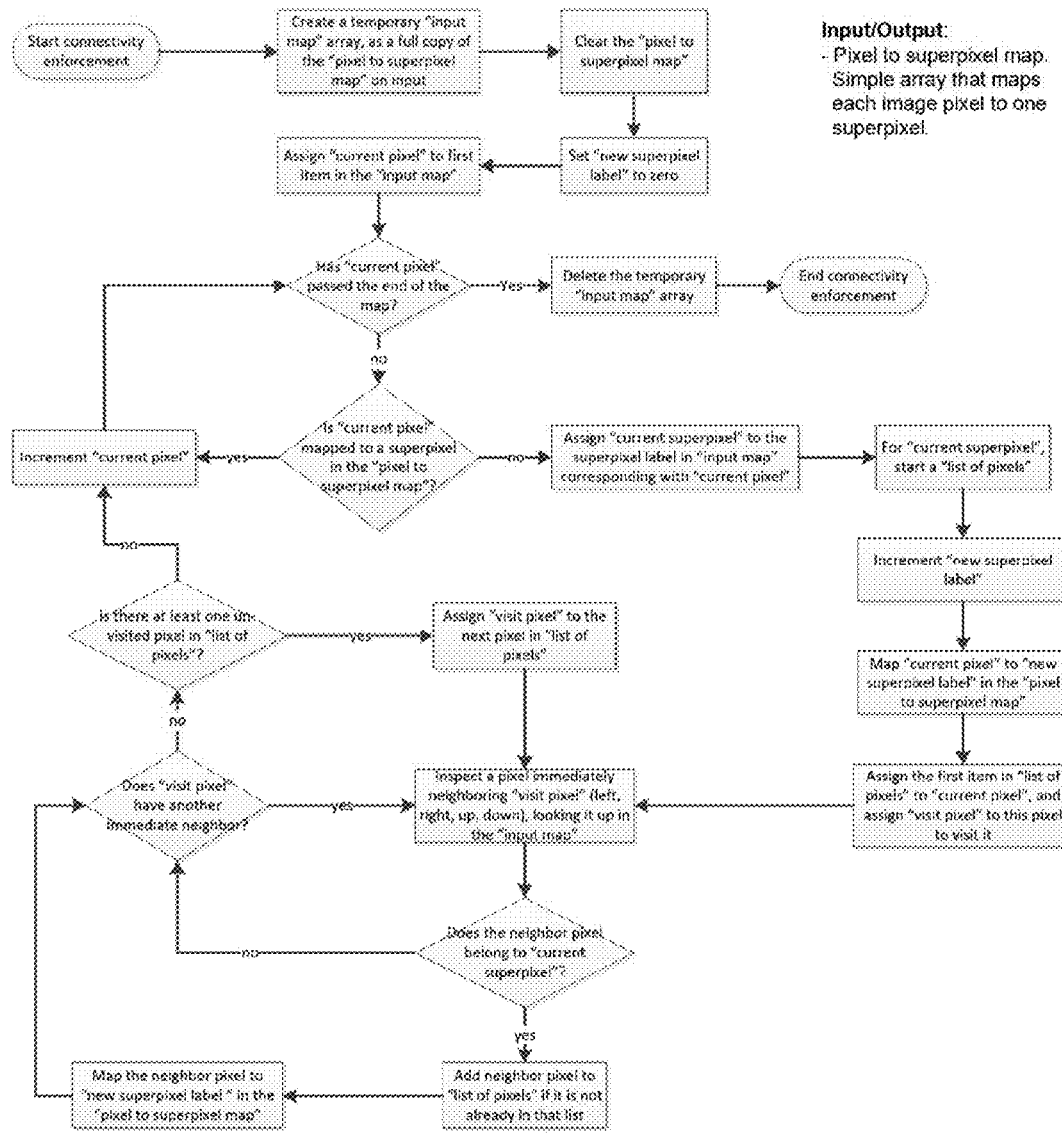
Figure 12C:
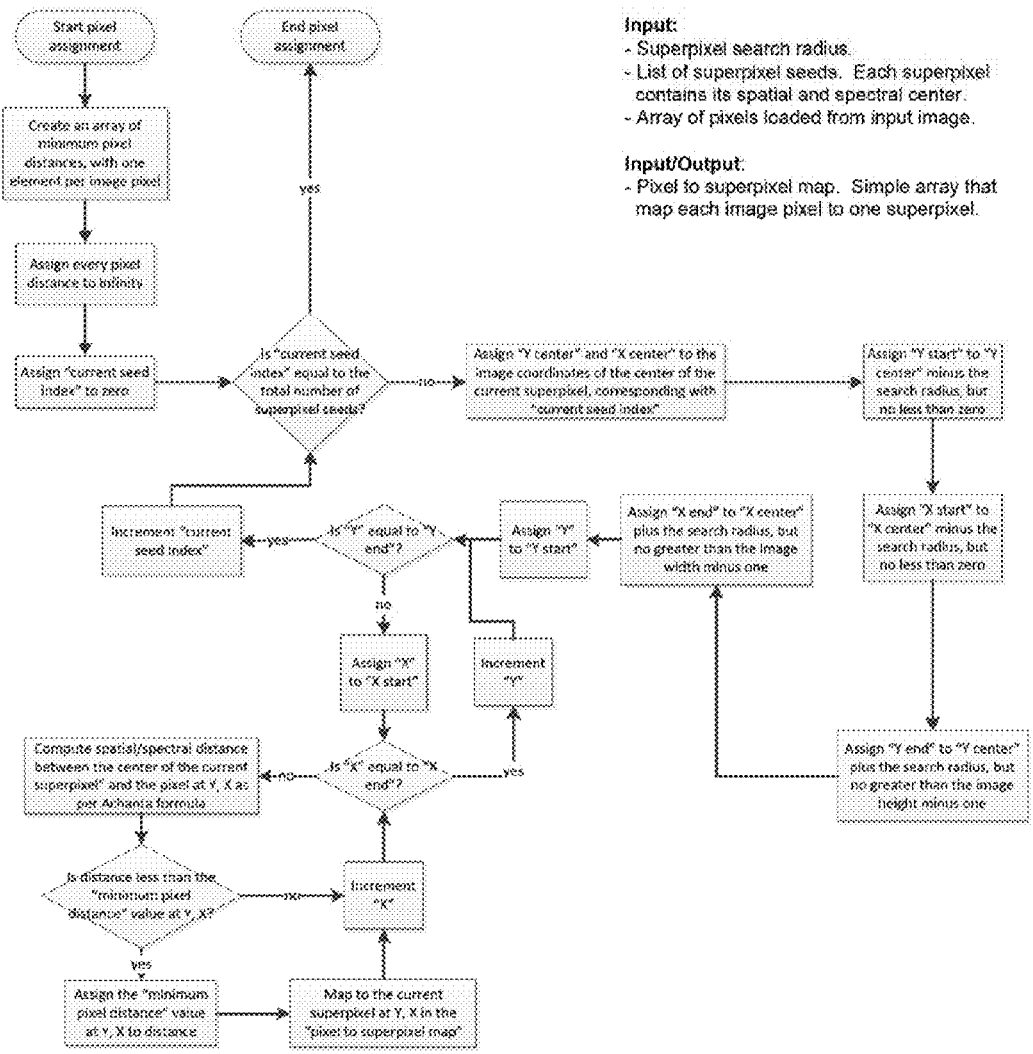
Figure 12D:
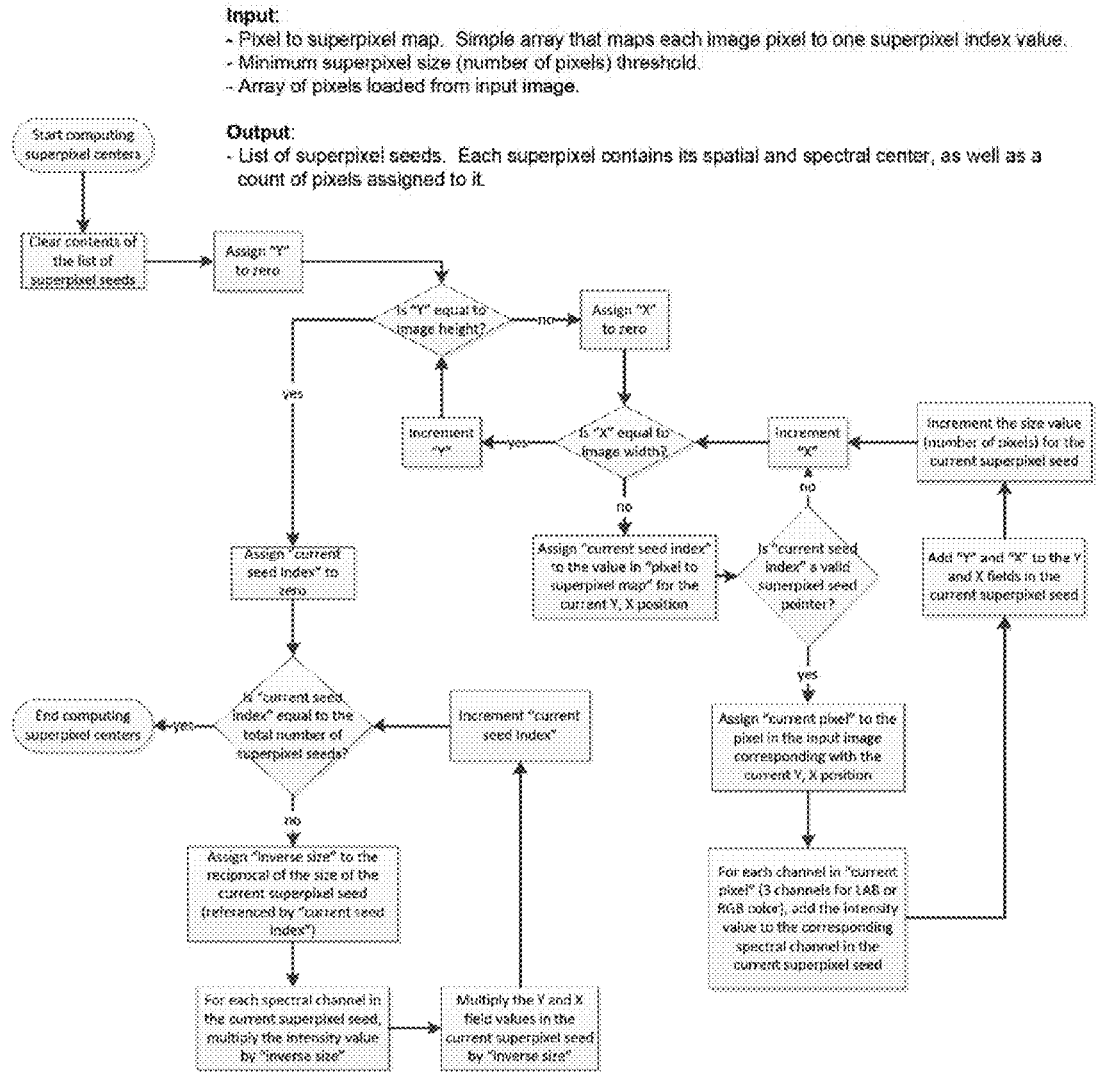
Figure 12E:
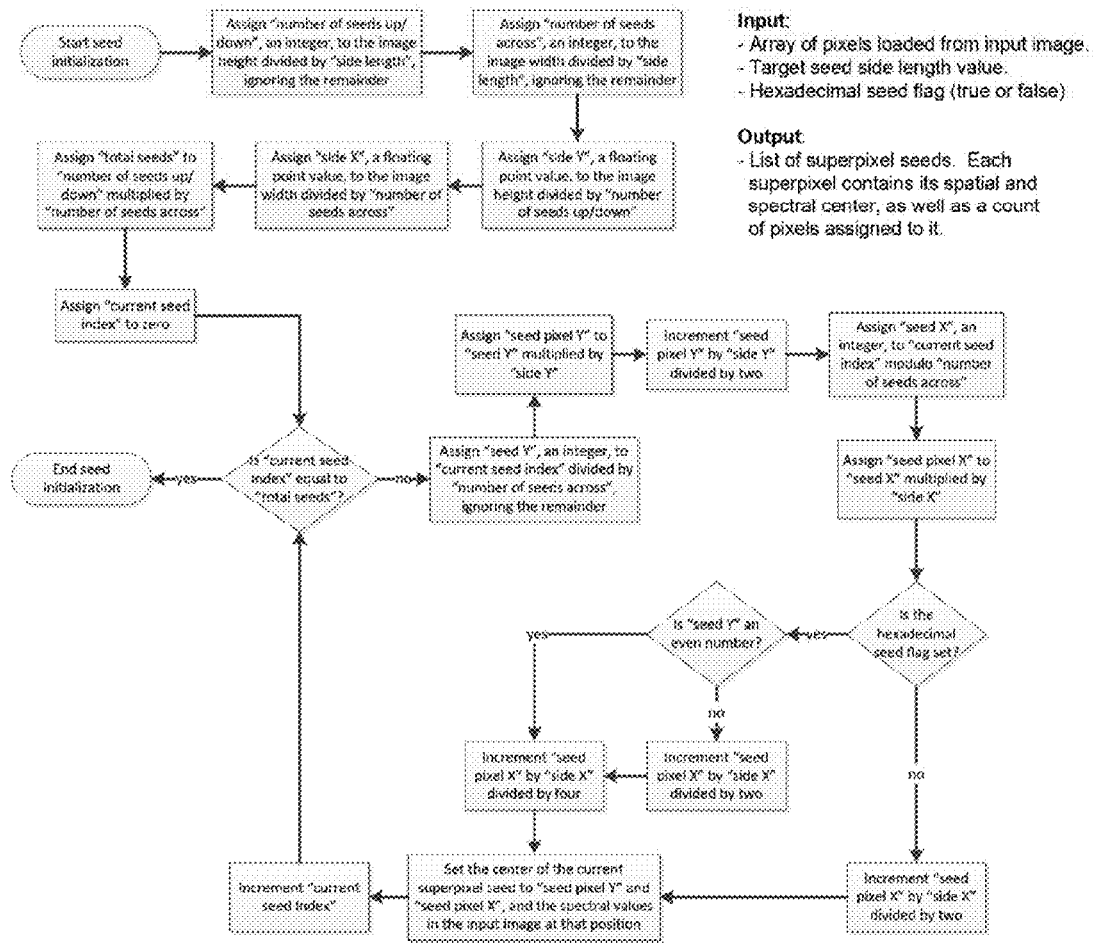

FIGS. 12-12E show the K-Means iterations in steps 1201-1205 in a series of flowcharts that enable one to visualize the operation of the ESEG algorithm. The first flowchart (FIG. 12) offers a high level view, and subsequent flowcharts (FIG. 12A_E) expand on particular portions of the algorithm.

SLIC Overview

SLIC is a precursor to ESEG (Enhanced Segmentation), which improves upon SLIC. As an application of K-Means, SLIC iteratively assigns image pixels to superpixel clusters based on a measure of the Euclidean distance between each pixel and each superpixel center. Where N is the number of image bands, each pixel or superpixel is characterized by a vector of length N+2 consisting of one value per image band as well as weighted X and Y spatial values derived from the pixel coordinates. The weighting of the X and Y values is controlled by a "regularization", or compactness parameter.

Initially, superpixel centers are "seeded" at regular spatial intervals throughout the image, in grid fashion. This spatial interval is controlled by a "side length" parameter. The vector characterizing each initial superpixel is derived from the image band values at its center pixel as well as the coordinates of that center pixel.

At each K-Means iteration, each superpixel is assigned those image pixels within its spatial search area for which that superpixel is the least "distant" superpixel. The search area is a square with length equal to the value of the side length parameter multiplied by four, plus one, with the superpixel's spatial center at the center of the square. Subsequently, within each iteration, the spectral/spatial vector characterizing each superpixel is recalculated as the mean of its constituent pixels.

The number of K-Means iterations is generally set to a fixed value that is adequate to allow the superpixels to converge, that is, to change little from iteration to iteration. ESEG can employ 10 K-Means iterations in its implementation.

Once the K-Means iterations are complete, superpixels lacking spatial contiguity are divided. Each contiguous unit is "walked" until all of its pixels have been visited, and is then treated as a separate superpixel. Further, superpixels that contain too few pixels to meet a minimum size threshold are consolidated with neighbors. The ESEG implementation can use a minimum size threshold equal to one fourth the area of each initial superpixel, or one fourth of the square of the side length parameter.

SLIC Superpixel Connectivity Enforcement

A SLIC method is described in Radhakrishna Achanta, Appu Shaji, Kevin Smith, Aurelien Lucchi, Pascal Fua, and Sabine Süsstrunk, SLIC Superpixels, EPFL Technical Report 149300, June 2010 ("Achanta"). Achanta states that at the conclusion of the K-Means iterations, "a few stray labels may remain, that is, a few pixels in the vicinity of a larger segment having the same label but not connected to it."

Running SLIC and ESEG on near-nadir aerial and satellite imagery, however, we observe that the number of dis-contiguous superpixel areas is typically quite substantial, easily a couple of orders of magnitude greater than the initial number of superpixels.

For example, running an implementation of SLIC on a 1024×768 crop of an aerial image with a superpixel side length of 100 pixels and the regularization parameter set to the typical setting of 10.0, there are 70 initial superpixels. However, at the conclusion of 10 K-Means iterations, the SLIC "connectivity enforcement" function reports encountering 10,637 dis-contiguous areas stemming from the 70 superpixels.

Further, we find that as those dis-contiguous areas are turned into new superpixels, the result is a large number of superpixels that are too small to be retained, that is, they do not meet the minimum size threshold and need to be consolidated with larger superpixels. The reason for the size threshold is to keep the superpixels roughly proportional in size to the configured side length and thus relevant. In the above example, of the total 10,707 distinct superpixel areas, 10,610 are removed because of their small sizes.

Treatment of Superpixels Requiring Consolidation

The manner in which the smallest superpixels are consolidated markedly affects the quality of the final results. ESEG significantly improves upon SLIC in this area.

SLIC uses what we refer to as a "brute force" consolidation method. Each too-small superpixel is arbitrarily assigned to an adjacent superpixel, with no consideration for which neighbor has the greatest spectral similarity to itself.

ESEG, on the other hand, selects the most similar superpixel neighbor in each successive consolidation operation. We refer to this as the "best match" method. Better correspondence with boundaries in the input image is achieved.

"Best Match" Superpixel Consolidation Algorithm

The Achanta SLIC "connectivity enforcement" routine performs the dual functions of dividing dis-contiguous superpixels and consolidating small superpixels. ESEG, on the other hand, can do this in multiple stages. This portion of the ESEG algorithm differentiates it from the Achanta SLIC implementation and involves the following steps:

1. Enforce the connectivity of superpixel areas by creating a new superpixel for each dis-contiguous area. All superpixels are now contiguous.
2. Compute the spectral and spatial center of every superpixel.
3. Make a pass through all pixels in the image, identifying pixels belonging to small superpixels that are in need of consolidation due to their sizes.
4. For each small superpixel, visit and make a record of all constituent pixels and all neighboring superpixels.
5. For each small superpixel, for each neighboring superpixel, compute a spatial/spectral distance between the respective superpixel centers.
6. For each small superpixel, consolidate with the least "distant" neighbor. This is done by iterating through the list of all constituent pixels and re-assigning them to that neighbor.

This consolidation algorithm is local in nature and scales approximately linearly with respect to image size. It should be noted that references to "all" in the steps above are one example, and some embodiments may employ smaller subsets of the total amount.

Enhancements to Support Tiling

Processing large, multi-band raster data sets can be memory intensive. ESEG includes enhancements to support tiling, so that at any given time, only a portion of the raster is loaded into memory and processed to produce polygons. This is done in a manner that is virtually seamless, producing superpixels that are not noticeably affected by tile boundaries. ESEG is thus able to produce excellent results while maintaining a relatively modest memory footprint.

Prerequisite: NoData Handling

ESEG's tiling approach requires that NoData areas be skipped in performing segmentation. ArcGIS allows raster datasets to be defined as having a NoData value, the standard way of indicating that a given raster cell should be considered to not contain any data. In assigning pixels to superpixels, ESEG omits those with NoData values. Output polygons are created for "data" areas of the raster, a feature not found in SLIC.

Further, when seeding the initial superpixels, no seed is assigned to any cell location with a NoData value. As this has the potential to leave certain areas of a given raster with insufficient seeding, ESEG can verify that every pixel is within reasonable proximity of at least one initial superpixel seed, then creates additional seeds where necessary.

Tiling Strategy

ESEG can handle tiling in a seamless manner because it "cuts" along superpixel boundaries near the edges of each tile, then later refills those areas when processing adjacent tiles. Cutting along superpixel boundaries is important, as cutting along strict tile boundaries would produce artificially straight superpixel edges unsuitable for much analytical work.

ESEG tiles each input raster in a left to right and up to down manner, using the same size for each tile. At the conclusion of processing each tile, pixels near the bottom and right edges of the tile are "cached" so that they can potentially be reprocessed along with subsequent, adjacent tiles.

Before this "caching" takes place, however, superpixels abutting the right and bottom edges of the tile can be removed, and are not included in the results of processing that tile. ESEG instead processes the underlying pixels with the subsequent, adjacent tiles.

In the right and bottom edge caches, ESEG sets NoData values to avoid reprocessing pixels underlying retained (not removed) superpixels; those pixels can be set to NoData in the caches. Because the pixels underlying the removed superpixels continue to have data values, they get reprocessed with the subsequent, adjacent tiles.

Superpixel Statistics

For the set of pixels in each superpixel polygon, for each processed image band, the Segment Raster tool generates a panel of statistics.

Within each superpixel, the minimum value, maximum value, mean, median, mode, range, standard deviation, and entropy statistics are calculated on all of the pixels in each processed image band. The following formula can be used for the entropy value, where b (base) is 2, N is the number of pixels, and $n_i$ is the number of pixels having a particular intensity value:

$$\log_b N - \frac{1}{N} \sum_i n_i \log_b n_i$$

Simple Grid-Based Superpixels

As an alternative to performing segmentation, the Segment Raster tool has an option to divide the image using a simple grid. Pixel band statistics, as shown above, are generated on the contents of each grid cell polygon.

ESEG Conclusion

Building on the linear complexity and good results achieved by SLIC, ESEG goes a step further by offering superior boundary adherence. The Segment Raster tool which implements the ESEG algorithm offers the convenience of results in the form of polygon features accompanied by superpixel statistics as well as the option to divide the image using a simple grid.

CONCLUSION

While the invention has been described with respect to specific embodiments, one of ordinary skill in the art will recognize that numerous modifications are possible. Thus, although the invention has been described with respect to specific embodiments, it will be appreciated that the invention is intended to cover all modifications and equivalents within the scope of the following claims.

The above disclosure provides examples and aspects relating to various embodiments within the scope of claims, appended hereto or later added in accordance with applicable law. However, these examples are not limiting as to how any disclosed aspect may be implemented.

All the features disclosed in this specification (including any accompanying claims, abstract, and drawings) can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, sixth paragraph. In particular, the use of "step of" in the claims herein is not intended to invoke the provisions of 35 U.S.C. §112, sixth paragraph.

What is claimed is:

1. A computer-implemented method of identifying features in imagery comprising:
   receiving an image;
   grouping selected pixels of the image into a plurality of superpixels;
   storing in memory a delineation of the superpixels;
   analyzing at least two or more of the plurality of superpixels, the superpixels having an entropy, and the analyzing including determining an indication of the entropy;
   storing in memory an indication of the amount of entropy for each of the analyzed superpixels;
   identifying superpixels based on an amount of entropy;
   identifying clusters of superpixels based on both (1) the indication of the amount of entropy for each of the analyzed superpixels and (2) superpixels that are proximate in location, to produce identified clusters;
   storing data delineating the identified clusters in memory, the clusters representing only a portion of the image;
   determining whether a cluster density exceeds a predetermined value as a factor in identifying the clusters;
   clipping the image to only include the identified groups of superpixels having the predetermined cluster density and entropy;
   analyzing statistical parameters of the clipped image;
   analyzing geometric factors of the clipped image;
   determining one or more settlements based on the statistical parameters and geometric factors of the superpixels; and
   identifying a shape and area of the one or more settlements based on the statistical parameters and geometric factors of the clipped image.

2. The computer-implemented method of claim 1 wherein the statistical parameters of the clipped image include one or more of a contrast, mean, mode, median, standard deviation, and entropy.

3. The computer-implemented method of claim 1 wherein the geometric factors include edge detection.

4. The computer-implemented method of claim 1 further comprising:
   identifying boundaries of the one or more settlements based on spatial and spectral parameters of proximate superpixels.

5. The computer implemented method of claim 1 wherein the superpixels clustering uses an enhanced segmentation process comprising:
   determining a proximity of superpixels; and
   determining a best match of superpixels using statistics.

6. The computer-implemented method of claim 5 wherein the statistics include entropy.

7. The computer-implemented method of claim 1 wherein the clusters of superpixels correspond to estimated areas of human settlement.

8. A non-transitory computer-readable medium comprising instructions stored thereon for identifying features in imagery, the instructions, when executed on a processor, perform the steps of:
   receiving an image;
   grouping selected pixels of the image into a plurality of superpixels;
   storing in memory a delineation of the superpixels;
   analyzing at least two or more of the plurality of superpixels, the superpixels having an entropy, and the analyzing including determining an indication of the entropy;
   storing in memory an indication of the amount of entropy for each of the analyzed superpixels;
   identifying superpixels based on an amount of entropy;
   identifying clusters of superpixels based on both (1) the indication of the amount of entropy for each of the analyzed superpixels and (2) superpixels that are proximate in location, to produce identified clusters;
   storing data delineating the identified clusters in memory, the clusters representing only a portion of the image;
   determining whether a cluster density exceeds a predetermined value as a factor in identifying the clusters;
   clipping the image to only include the identified groups of superpixels having the predetermined cluster density and entropy;
   analyzing statistical parameters of the clipped image;
   analyzing geometric factors of the clipped image;

determining one or more settlements based on the statistical parameters and geometric factors of the superpixels; and identifying a shape and area of the one or more settlements based on the statistical parameters and geometric factors of the clipped image.

9. The non-transitory computer-readable medium of claim 8 wherein the statistical parameters of the clipped image include one or more of a contrast, mean, mode, median, standard deviation, and entropy.

10. The non-transitory computer-readable medium of claim 8 wherein the geometric factors include edge detection.

11. The non-transitory computer-readable medium of claim 8 further comprising:

identifying boundaries of the one or more settlements based on spatial and spectral parameters of proximate superpixels.

12. The non-transitory computer-readable medium of claim 8 wherein the superpixels clustering uses an enhanced segmentation process comprising:

determining a proximity of superpixels; and determining a best match of superpixels using statistics.

13. The non-transitory computer-readable medium method of claim 12 wherein the statistics include entropy.

14. A system for identifying features in imagery, a memory:

a processor;

a non-transitory computer-readable medium comprising instructions stored thereon, the instructions, when executed on the processor, perform the steps of:

receiving an image;

grouping selected pixels of the image into a plurality of superpixels;

storing in the memory a delineation of the superpixels;

analyzing at least two or more of the plurality of superpixels, the superpixels having an entropy, and the analyzing including determining an indication of the entropy;

storing in the memory an indication of the amount of entropy for each of the analyzed superpixels;

identifying superpixels based on an amount of entropy;

identifying clusters of superpixels based on both (1) the indication of the amount of entropy for each of the analyzed superpixels and (2) superpixels that are proximate in location to produce identified clusters;

storing data delineating the identified clusters in the memory, the clusters representing only a portion of the image;

determining whether a cluster density exceeds a predetermined value as a factor in identifying the clusters;

clipping the image to only include the identified groups of superpixels having the predetermined cluster density and entropy;

analyzing statistical parameters of the clipped image;

analyzing geometric factors of the clipped image;

determining one or more settlements based on the statistical parameters and geometric factors of the superpixels; and identifying a shape and area of the one or more settlements based on the statistical parameters and geometric factors of the clipped image.

* * * * *